United States Patent

[11] 3,623,001

[72] Inventors Robert A. Kleist
Anaheim;
David W. Mayne, San Juan Capistrano;
Robert L. Thorne, Anaheim, all of Calif.
[21] Appl. No. 951
[22] Filed Jan. 6, 1970
[45] Patented Nov. 23, 1971
[73] Assignee Peripheral Business Equipment, Inc.

[54] INPUT DATA PREPARATION SYSTEM
39 Claims, 6 Drawing Figs.

[52] U.S. Cl. .......... 340/172.5
[51] Int. Cl. .......... H04l 5/00, G06f 7/00
[50] Field of Search .......... 340/172.5

[56] References Cited

UNITED STATES PATENTS

| | | | |
|---|---|---|---|
| 3,248,705 | 4/1966 | Dammann et al. | 340/172.5 |
| 3,336,582 | 8/1967 | Beausoler et al. | 340/172.5 |
| 3,346,853 | 10/1967 | Koster et al. | 340/172.5 |
| 3,501,746 | 3/1970 | Vosbury | 340/172.5 |
| 3,456,242 | 7/1969 | Lubkin et al. | 340/172.5 |

*Primary Examiner*—Gareth D. Shaw
*Assistant Examiner*—R. F. Chapuran
*Attorney*—Fraser and Bogucki

ABSTRACT: An input preparation system is provided that can generate a series of data records on a single high-capacity storage member in computer compatible form from a variable number of input stations that may operate in different modes. Each of a number of input data preparation systems includes a key board and a memory for storing at least one block of data, and a sequencing control that can govern output transfer of a stored block of data when the unit is employed alone, or accept external command when a number of units are to be used together. The data input systems may comprise keyboard units, magnetic tape units, combinations of these, or other units, such as card systems, that are capable of storing a block of data. In order to combine the data blocks, each input system is coupled to a separate pooling circuit in an intercoupled queuing chain of pooling circuits. Blocks of data may be initially generated asynchronously at relatively slow, operator-controlled rates, and then queued on a priority basis determined by location in the chain and the status of transfer requests to a single-record generating unit, or to a data transmission system. The arrangement is such that different system modes, such as data entry, merging and verifying may be used at different stations along the chain. Each single station may be employed independently, together with appropriate recording equipment, or coupled in a short length or long length pooling chain, with acceptable operator delay times being achieved at the lowest priority station in a chain of substantial length.

PATENTED NOV 23 1971 3,623,001

INVENTORS
ROBERT A. KLEIST
DAVID W. MAYNE
ROBERT L. THORNE
BY
Fraser and Bogucki
ATTORNEYS

INVENTORS
ROBERT A. KLEIST
DAVID W. MAYNE
ROBERT L. THORNE

BY

*Fraser and Bogucki*
ATTORNEYS

INVENTORS
ROBERT A. KLEIST
DAVID W. MAYNE
ROBERT L. THORNE
BY
Fraser and Bogucki
ATTORNEYS

PATENTED NOV 23 1971

3,623,001

SHEET 4 OF 6

INVENTORS
ROBERT A. KLEIST
DAVID W. MAYNE
ROBERT L. THORNE

BY

Fraser and Bogucki
ATTORNEYS

INVENTORS
ROBERT A. KLEIST
DAVID W. MAYNE
ROBERT L. THORNE

BY Fraser and Bogucki
ATTORNEYS

INVENTORS
ROBERT A. KLEIST
DAVID W. MAYNE
ROBERT L. THORNE

BY

Fraser and Bogucki
ATTORNEYS

INPUT DATA PREPARATION SYSTEM

BACKGROUND OF THE INVENTION

1. Field of the Invention

This invention relates to input data preparation systems, and more particularly to systems for recording or otherwise processing batches of input data in computer-compatible form.

2. History of the Prior Art

The term "keypunch" refers, in the data processing context, to an input data preparation machine and procedure that for some time have provided the basic technique for converting masses of data in document form into machine-processable form. An operator at a keyboard controls the punching of a standard (generally 80 or 120 character) punch card, originally referred to as Hollerith card. For ease of entry and processing, the available character positions are generally disposed in fields, with given fields generally being devoted to particular types of information e.g., numeric or alphabetic information) and with some perhaps having arbitrary information. Thus, essential data as to a commercial transaction (premium payment, purchase order, change of address) is entered on the card in a predetermined format for subsequent processing and storage. To speed the entry sequence and minimize errors, fields may be skipped or duplicated, and in a certain proportion of instances it is desirable to minimize errors by verification, i.e., comparison of records prepared by one operator to those generated independently by another operator.

The time proven sequences and formats used with keypunch machines and punch cards are not only accepted but desired for most applications. Card punch equipment is, however, subject to certain disadvantages, in particular with respect to certain limitations on operator throughput, and also with respect to noisiness and the cost of the cards, which can of course only be used once. More recently, therefore, there have been developed a number of input data preparation machines which enter key data onto magnetic tape, and which parallel the keypunch system as to format and function. Such machines have largely fallen into either of two categories, namely single key to single tape recording systems, and multiple key input stations multiplexed into a large off-line controller or a general purpose computer system which prepares a combined record for subsequent use by the main data processor.

The single input and single record systems can be of relatively low cost, but they are nonetheless wasteful in two major respects where numbers of operators are required. Each station employs a separate digital magnetic tape recorder, with attendant cost, and each prepares a separate tape of relatively short length, so that a substantial amount of operator time and effort are required to input the separate tapes into the main data processor.

The use of multiple input stations with a central computer or other large controller permits incorporation of a number of formatting and error-checking functions, and additional functions such as monitoring of operator throughput, but nonetheless primarily results only in the preparation of a record. From the cost standpoint, therefore, a substantial number of key input stations must be used with each computer or controller in order to achieve the same per station cost as individual units.

The various key-to-tape input data preparation machines conventionally provide not only the skipping and duplicating and related functions, but also selectable program control and error checking. Typically, two programs may be stored in a memory, with either program being selectable and providing an instruction character for each character position to be entered in the memory. Thus, the program identifies each field and permissible characters to be entered within the field and governs skipping, duplicating and other functions. The available systems also include means for checking the permissibility of input characters relative to field location, for detecting and indicating other errors, for sequences to permit correction of errors, and for entering programs. Systems in accordance with the present invention provide comparable features, but for simplicity and clarity in describing the invention those features that are available in the accepted state of the art are not described or reviewed in detail herein.

It is also desirable, however, to incorporate additional features, such as field justification or "left zero" setting, variable record length entry, and program interchange. The use of left zero is desirable because, for example, a data processing program can be greatly simplified if all characters in a field can be shifted so that the terminal character is located at one side of the field. Variable or programmed record length can be extremely useful, because if a record can be terminated at any permissible point after the completion of entry of data there is a saving both in the operator entry time and in the length of storage medium needed. Program interchange capability means that an individual key unit can generate its own programs, request or be provided new programs along a chain, and that the head station in the chain can insert keyboard-generated or tape-stored programs.

It is evident that the single key-to-tape system does not have sufficient versatility for the many data preparation applications in which variable, relatively limited numbers of operators may be utilized in different combinations. It is often useful, for example, to have different operators doing different jobs in the preparation of a single record, such as combining keyboard input from one or more stations with inputs merged in from a different tape, and also with verified data provided from one or more additional stations. Although a large central controller can perform these and additional functions, the large initial cost associated with the controller or computer renders this type of installation marginal except where a substantial number of operators (e.g., approximately 25) are constantly on line and prohibitive where lesser numbers (e.g., approximately 15) of operators are on line. In addition, system malfunctioning prevents the usage of any of the keyboard units.

A number of data multiplexing systems are known that relate to the broad problem of compiling data or preparing a unified record from asynchronously derived inputs. In these systems, as in the systems using a large controller, input data is multiplexed on a character-by-character basis. Thus, because of the much greater speed of the digital data processing system, an individual operator need not wait any longer from one character to another than is required for the data processing system to complete a scan of all the available input positions. However, such multiplexing techniques require full parallel capacity at the central controller for the maximum number of positions that might be used, even though considerably less positions are actually used. Consequently in achieving acceptably small delays in responding to operator data entry, such systems are committed to the large initial expense involved in selecting a maximum number of inputs.

SUMMARY OF THE INVENTION

Objects and purposes of the present invention are achieved by systems using modular data input preparation systems, together with individually associated pooling circuits arranged to transfer data in queuing fashion along a chain. Each input unit incorporates a memory for a data record or block, into which memory data may be entered as it is asynchronously generated by an operator on a character-by-character basis, or synchronously provided from a recorder system or a pooling chain. Internal sequencing and control circuits provide enabling signals for an associated recorder or pooling circuit in accordance with a selected operating mode, such as data entry, merge or verify. A single key unit may be employed with a single digital magnetic tape recorder, in which event the sequencing and control circuits transfer entered data blocks as output to the tape recorder, as well as providing error checking. Individual key unit modules incorporate data buses and control lines that may be connected into the queuing chain by the pooling circuits, which are also of modular form. A separate pooling circuit module is coupled to each different data input module, with the pooling circuits actually defining the series chain and providing the priority selection function. Command signals as well as data blocks are transferred along the pooling circuits, with data blocks being multiplexed into the recorder through the pooling circuit that has the highest priority position.

Arrangements in accordance with the invention provide great flexibility in input data preparation, both as to the number of operators that may be used and the types of operating modes that may be observed while combining input data blocks onto a single record. For single station use, a relatively low-cost recorder is used with an individual key input station. Where a limited number of key units are to be employed, they may be coupled to separate pooling circuits in a pooling chain, sharing the digital recorder coupled to the first-pooling circuit in the chain. The pooling circuits receive only request signals from data input units, and a select signal from the head unit in the chain, but determine the release of data from an individual unit based upon the availability of data at that unit and its priority position in the chain. When a given unit is in operation, all lower units in the chain are disconnected, and cannot operate to transfer data because they can receive no select signal. Higher priority units cannot transfer data because they receive and respond to the previously initiated request signal from the lower order unit in the chain. When the lower order unit that is then transferring completes its operation, the select signal is again provided, and the unit having available data having the highest order position in the chain then operates to transfer its data block. Transfer is made at high transfer rates on a block basis from a data block memory in the input station to a data block memory in the recorder system, and back again for comparison and error detection. The system may then also compare the data recorded on the output record member to the block stored in the memory for the recorder system.

A significant advantage of systems in accordance with the invention is that each data input station cooperates in the same fashion with the pooling chain, regardless of the number of units in the chain and the manner in which they may be intermixed. Consequently, a chain may be extended or shortened, and individual units may be shifted or substituted with complete freedom. Separate input stations having coupled data recorders may be incorporated in the pooling chain to merge the data records from the separate recorders onto a central recorder. At one or more stations, an operator may verify a previously recorded number of data blocks by separately entering the data blocks on the keyboard, with each block being released into the chain after verification.

In conjunction with this versatility, another important aspect of the invention resides in the realization of a combination by which acceptable delay times are achieved for the lowest priority operator in a chain of substantial length. Approximately 8 to 10 seconds is generally required for entry of a typical data block. The transfer of a data block and the return of the data block for checking require intervals that are only on the order of a few milliseconds. Data entry on a typical low-cost output unit, such as a digital magnetic tape recorder, is arranged to be accomplished within the order of tens of milliseconds. It is shown that, in systems in accordance with the invention, the lowest priority operator in a substantial chain (e.g., in excess of 10 units) can nonetheless expect to operate with delays of less than a second. Consequently, the need for a large controller is entirely eliminated, with attendant savings in cost and complexity.

The data blocks that are generated and pooled are provided on a computer-compatible basis, both as to coding and transfer rates. Consequently, the data may be entered not only on tape systems but in disk or other recording systems, or may be entered into a data transmission system for direct transfer to a remote computer or data storage system.

Systems in accordance with the invention also provide a left zero function by incorporation of circuits that shift the position of characters in a field in the memory during data entry. Thus, an operator can enter data starting at the beginning of a field and have the data shifted within the field without being required to make the necessary mental computations. Program and data bits are sensed and manipulated in accomplishing this function, and also in signalling the end of record at any selected position within a block. For this purpose, the end of record signal is used to initiate the counter overflow signal normally occurring at the end of a block.

Program interchangeability is achieved by using the memory-to-memory transfer capability, in conjunction with program request and select signals. The master unit is provided with a tape search capability that enables any of a library of programs to be located and entered, after which it may be transferred along the chain.

BRIEF DESCRIPTION OF THE DRAWINGS

A better understanding of the invention may be had from the following description, taken in conjunction with the accompanying drawings, in which.

DETAILED DESCRIPTION

Figure 1:
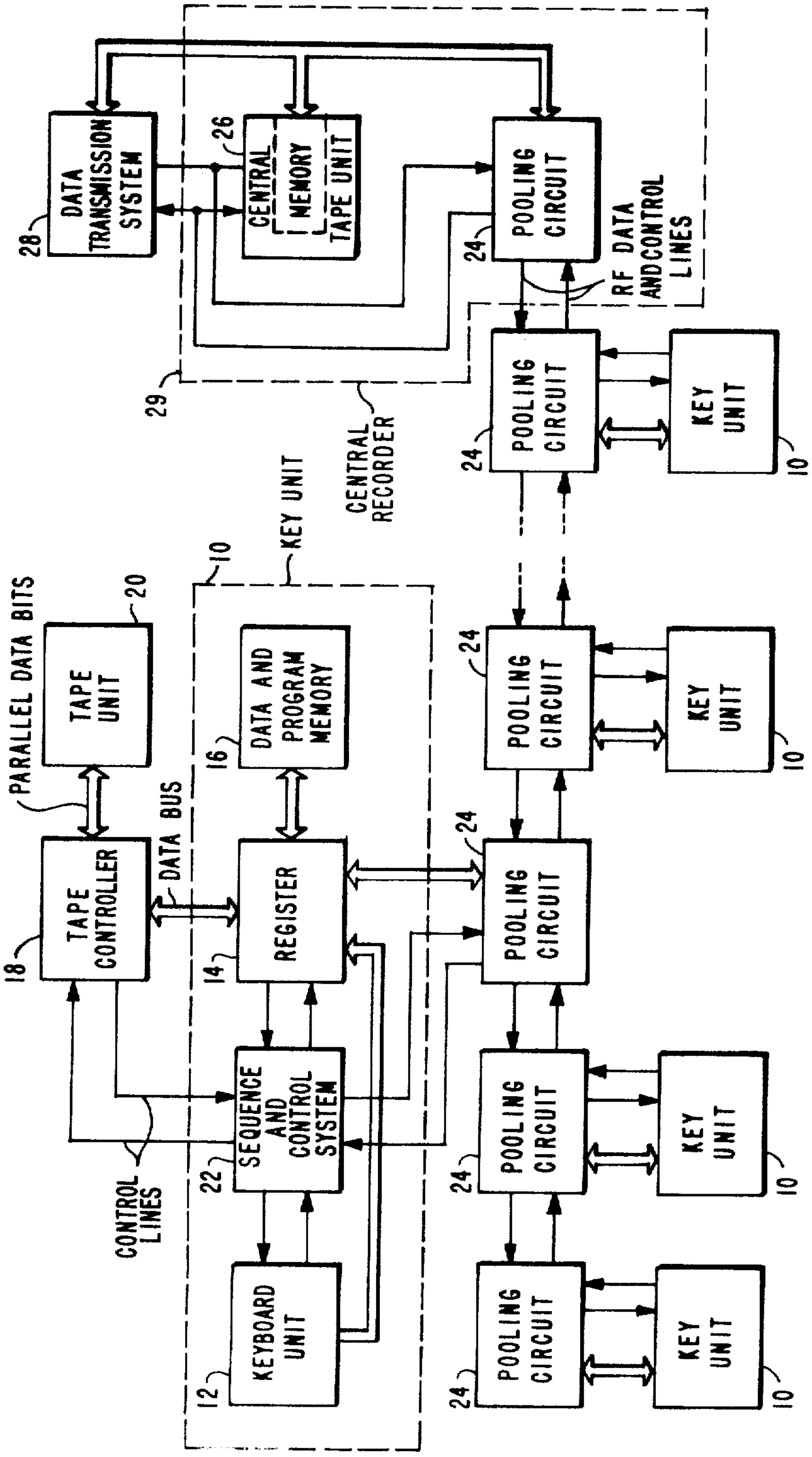
FIG. 1 is a block diagram of the principal elements of an illustrative system utilizing a number of input data preparation systems.

An input data preparation system in accordance with the invention that illustrates the flexibility and versatility of such systems is shown in block diagram form in FIG. 1. Data blocks are generated asynchronously at keyboards within separate key units 10, which are of like modular construction. One key unit 10 is shown in some further detail, and each of the remaining key units should be understood to incorporate like functional subsystems and interconnections. The operator actuates a keyboard unit 12 having a data bus comprising parallel bit lines (illustrated by a dual line interconnection) coupled to a character register 14 which in turn couples the character, still in the form of parallel data bits, into a data and program memory 16. The memory 16 has a length determined by the maximum number of characters desired for a given record, here chosen as 200. As is described in greater detail below, the number of characters in the record may be programmed to any length, although it is assumed that a minimum block of 20 characters is employed inasmuch as existing computer standards generally require this minimum. Data transfer from the memory 16 takes place through the register 14 to and from either of two external data bus connections in this example. If the key unit 10 is to be employed alone with a data recording system, such as a digital magnetic tape recorder, one data bus from the register 14 is coupled through a tape controller 18 to a digital magnetic tape unit 20. These units 18, 20 may be conventional commercially available units that provide tape loading, including load point sensing; format control, such as the inclusion of appropriate start and stop delays and gap writing; but synchronization, and error checking. Other types of data recording systems, particularly disk systems, might alternatively be employed, but in any event the internal functioning of these systems in responding to data and commands is well understood and need not be further elaborated.

The key unit also includes a sequence and control system 22, described in further detail below, and incorporating the internal functions that are widely employed in existing input data preparation systems. While these internal functions will not be described in detail in order to simplify and shorten the specification, it should be understood that the data and program memory 16 incorporates changeable program instructions for each character position, there generally being two complete programs to define the field and particular operations (such as skipping and duplicating) to be provided within those fields, as well as numeric and alphabetic instructions. The existence of errors such as impermissible characters is indicated to the operator on a suitable display. Although only two control lines are shown as intercoupling the sequence and control system 22 to the various units, this is to be understood as merely a symbolic representation, because the actual number of lines is determined in each instance by the available switches and control keys that determine the selected modes and the various control functions.

In the operation of the key unit 10 as a separate input station, the unit cooperates only with the tape controller 18 and the tape unit 20. The sequence and control system 22 provides enabling signals first to permit transfer under appropriate program control, of asynchronously generated data from the keyboard, on a character-by-character basis, through the register 14 into the appropriate positions of the memory 16. When a data block has been entered in the memory 16, the sequence and control circuits 22 then enable the output transfer of the data block on a synchronous high-speed basis into the tape recorder system. The data bits remain in parallel at all times during these transfers. In addition, it is desirable to check the accuracy of the recording on the record member, and this is accomplished by sequencing the tape controller 18 and the tape unit 20, in conventional fashion, to reverse back to the start of the data block and to reread the data block so as to make a character-by-character comparison to the contents of the block that is still in the memory 16, after which the recorder system is released and the keyboard unit is again enabled, in order to accept another operator-generated record.

The sequence and control system 22 also incorporates means, selectable by operator switches, for alternately enabling keyboard entry and pooling operations, and for enabling the keyboard system 12 and the tape unit 20 to effect merge and verify functions. Cooperation with a plurality of pooling circuits 24, each associated with a different key unit 10 or other input data preparation system, permits each data preparation system to be utilized on line with a single central tape unit 26 or alternatively with a data transmission system 28. The central tape unit 26 is again chosen by way of example as a digital magnetic tape recorder, incorporating a data block memory, means for generating a pooling enable signal, and a tape controller system. Together with its pooling circuit 20, the central tape unit 26 forms what may be called a central recorder 29. The digital magnetic tape system in the central recorder 29 is chosen to be a higher performance unit than the tape unit 20. In the practical example being described, the central recorder has a nominal-operating speed of 25 i.p.s. in comparison to a nominal operating speed of 12.5 i.p.s. for the unit 20, with correspondingly faster start and stop times. Consequently, the central tape unit 26 is a more costly unit, but only a single such unit need be employed for a substantial pooling chain. A data transmission system 28 is shown as coupled in parallel with the central recorder 29 although of course the units will generally be operated separately. Although the central recorder 29 and the data transmission system 28 may receive the data directly from the pooling circuit intercouplings, the use of a parallel line data bus, as shown, in more conventional and is suitable for a wide variety of commercially available systems. The data transmission system 28 also incorporates a memory for receiving a data block and returning the received error block back to the transmitting data input preparation system for error checking, and may be any commercially available unit that incorporates means for generation of a suitable transmission code, including error checking bits, and synchronization of output data at a selected conventional data rate.

The pooling circuits 24 couple to the data bus of an associated station, but also provide bidirectional data and command signal transfer along individual RF lines, one used for each direction of serial transfer along the pooling circuits 24. Separate command signals are transferred on control lines to and from the key units 10, and the pooling circuits 24 unite the data and command signals into variable frequency sequences on the RF lines. When data is being transferred along the chain from a different unit of lower priority, each pooling circuit functions as a bidirectional repeater, but when the pooling circuit 24 is transferring data from its own associated input data preparation system, all lower priority units are disconnected.

Systems in accordance with the invention are thus arranged to initiate "request" signals and respond to "select" signals within each individual input data preparation system, such as a key unit 10, but the function of priority selection is primarily determined within the pooling circuits 24. Consequently the functioning of the pooling chain is independent of the units incorporated in it and the chain may be lengthened or shortened, and the units intermixed, to achieve the most efficient manner of accomplishing a given data preparation problem. In the example shown, the particular key unit 10 that is illustrated in greater detail and associated with the tape unit 20 is here assumed to be operating to verify data previously recorded by separate operator in the tape unit 20. Each of the operators controlling the other key units 10 is entering data on the keyboard. As each data record is made available to the pooling chain, it is selected for transfer into the central recorder 29 and the particular unit is thereafter released as soon as the echo-type comparison reveals that the transfer was effected correctly. In carrying out the verify operation, the record from the tape unit 20 is entered in the memory 16, and the operator at the keyboard 12 attempts to prepare the same record. As each character is entered, a comparison is made to the corresponding character position in the memory 16 and when the entire record has been completed without error, the stored data block is then available for release to the central recorder 29. In each instance of transfer of a data block, whether for entry into the memory of the recorder system or return for error checking, the transfer is synchronous and at a high transfer rate so that records and not characters are time shared on the pooling system, and many data records may be transferred while an operator is preparing a single such record.

It should particularly be appreciated that although preparation of a record (or output transfer through a data transmission system) assumes the existence of some sort of output device, that the tape unit 20 arranged with the key unit 10 can also be utilized as a low-cost central recorder. By way of example, although many other variations are feasible as will be evident from the subsequent description, the pooling circuit chain may be broken between the three lowest priority units and the remaining higher priority units. In such event, the key unit 10 having the coupled tape controller 18 and tape unit 20 constitutes the highest priority unit, and it is switched to operate as a central recorder, with its own keyboard unit 12 being disabled, while the sequence and control system 22 provides enabling signals to enable transfer of data blocks into the memory 16, retransmission of the data blocks back into the pooling chain for comparison purposes, and then output transfer of the stored data block to the tape unit 20 followed by rereading for error checking purposes if desired. Despite the lower performance characteristics of the tape unit 20 acceptable operator delay times for chains of moderate length (three to five units) are achieved within this system.

Consequently, if there is a malfunction in an overall system, a change in the nature of the job to be performed, a change in personnel or a need to perform various functions or work under different program controls, the input data preparation supervisor can distribute operators and machines with virtually complete freedom as individual units, short or long pooling chains, while in each instance approaching the optimum in cost savings.

Figure 2:
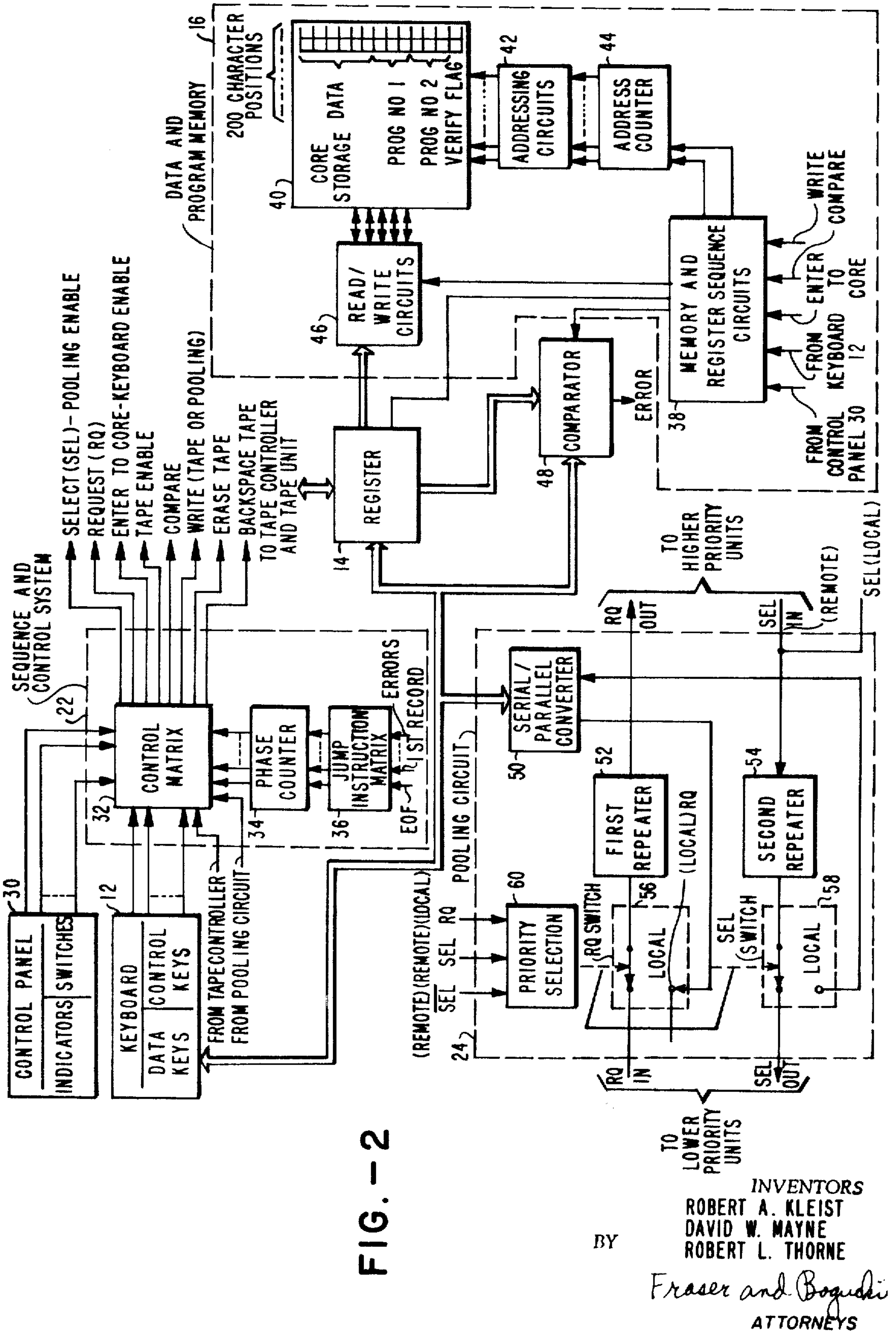
FIG. 2 is a more detailed block diagram of an input data preparation system and associated pooling circuit that may be employed in the arrangement of FIG. 1.

The block diagram of FIG. 2 depicts further details of the key unit 10 and pooling circuit 24 of FIG. 1. In addition to the keyboard unit 12, the system also includes a control panel 30, as is typical of systems of this type. The indicator portion of the control panel 30 provides indications of the characters as they are entered, the character position and various other data useful in the speedy preparation of a record. For brevity, further detail as to the indicators and displays has been omitted inasmuch as these may be conventional displays of the types now used. The control panel switches largely control program selection, system function (data entry, merge and verify), and system status (whether the system is being used offline with a single recorder or in a pooling chain, or as the recorder unit for a pooling chain). These mode and function switches provide control signals, along with the control key signals from the keyboard unit 12, to a control matrix 32 within the sequence and control system 22. The control matrix 32 also receives signals as to status from the tape controller and from the pooling circuits and is functionally controlled in subsequences by a phase counter 34 which cooperates with the control matrix 32 and a jump instruction matrix 36 so as to generate the controlled programs desired within the data entry sequence, particularly program control, error checking, the skip/dup function and graphical display. Even though the practical embodiment of the invention now being described incorporates advantageous features for these purposes, and provides additional functions, implementation of the skip, dup, error checking and other basic functions desired for data entry may correspond to systems now in use, and is therefore not included herein. A number of signals that are useful in the modular and interchangeable aspects of systems in accordance with the invention, however, are shown for identification, and these comprise the following:

1. The select (SEL) signal is generated by the control matrix to enable pooling when the key unit 10 is being used in the recorder mode.

2. The request (RQ) signal is generated when the system is operating on line, to indicate that a data block is available during transfer into the pooling chain.

3. An enter to core or keyboard enable signal is provided for character-by-character asynchronous entry and for locking up the keyboard.

4. A tape enable signal is provided to the tape controller to initiate tape motion. Only one of the enabling signals is being provided at a time, and depending upon online or offline operation the system switches between pooling enable and tape enable or between keyboard enable and tape enable or between keyboard enable and pooling enable.

5. A compare signal is provided to govern the comparison function used in the verify mode, in reading after writing from the tape unit, and in comparing a received data block to the originally transmitted data block.

6. The write signal, provided during transfer to tape or the pooling chain, effects the synchronous output of a data block to the appropriately designated unit.

7. An erase tape signal actuates the tape controller to reverse one data block and to erase the previously recorded block for entry of a new block.

8. The backspace tape signal is provided to the tape controller to return to the start of a data block for the rereading and error checking function.

These signals can actually be generated in straightforward sequences by stepping switches, but modern digital design techniques permit considerable consolidation of functions given the desired modes and general operating phases. The specific arrangement of a matrix to generate these signals is accomplished with considerable attention to the avoidance of redundant circuits, in conjunction with the circuits for performing the remainder of the data preparation functions. Inasmuch as so many alternatives are available, and inasmuch as only straightforward combinations of logical gating circuits are required for the specified signals to be generated, no specific example of the sequence and control system 22 is provided. Further specific information is included here, however, in conjunction with the subsequent figures in the drawings.

The data and program memory 16 cooperates with the register 14 under control of sequence circuits 38 which receive various command signals from the control matrix 32, as well as control signals from the switches of the control panel 30 and the control keys of the keyboard 12. Again, the bulk of the detailed functions are concerned with details of data preparation, and these are merely indicated generally for clarity. The write, compare and enter to core signals initiate repetitive sequences of the types commonly employed with random access memories. The register 14 transfers each character to be written into the memory 16 as well as each character read out of the memory, by appropriate coupling to the different associated units. Although separate data busses are shown to depict data flow, only a single data bus need be provided into and out of the register 14, with the appropriate input and output transfer units being enabled at the appropriate times by the control circuits.

The data and program memory 16 principally comprises a core storage 40 having a selected number (here 200) of character positions, with each character position, as shown for two of the positions, comprising a 13-bit word. Six bits are utilized for a data character, three bits each for two different program instructions, and the 13th bit being a flag bit utilized in the verify function. Addressing circuits 42 under control of an address counter 44 serially shift the core storage for operation of the read-write circuits 46 to transfer data characters into and out of the register 14. The sequencing through successive fields is continuous, although it will be understood that normal reversal sequences are employed in the event that errors are detected in the data entry or verify modes. A comparator 48 coupled to the register 14 receives successive characters in the data block either from the keyboard 12 as generated during a verify operation, or from the pooling circuit 24 when a block of data is retransmitted back to the key unit 10. The remaining set of inputs of the comparator 48 receive successive data bits on the data bus from the register 14 for character-by-character comparison and indication of error if such exists.

Therefore, within the key unit 10, including the output transfer lines to the tape controller and tape unit or to the pooling circuit, each data character is in parallel by bit form. When operating in the central recorder mode, the select signal is simply transmitted out to the pooling chain. The other units generate request signals when they are ready to transfer out data.

The pooling circuit 24 responds to request and select signal patterns to make priority selections internally within the pooling chain, and select the queuing order. The general arrangement of the pooling circuit 24 is shown in FIG. 2, with more specific details of the circuit being shown in FIG. 3 and described below. The parallel data bus from the key unit is coupled within the pooling circuit 24 to a serial to parallel converter 50 which functions bidirectionally to generate transitions representative of the successive bits in the data record. The converter 50 both converts parallel data received from the key unit 10 into serial data entered into the pooling circuit 24, and converts received serial data into its parallel equivalent for entry into the key unit 10.

Transmission of data along the pooling chain is accomplished by separate repeater circuits, here designated as the first repeater 52 and the second repeater 54, with the first repeater transferring the request (RQ) signal along the chain from lower priority to higher priority units, together with data transmitted in the same path, and the second repeater 54 transferring select (SEL) signals and data in the opposite direction. At the input to the second repeater 54, the select signal that is provided is either the signal from the immediately higher prior unit, or the internally generated SEL signal from the control matrix 32 if the key unit is being employed as the central recorder. Each of the repeaters 52, 54 conditions and slightly delays the input signals, but by wave shaping and retiming the signals there is no degradation in quality whatever the length of the chain, so that system reliability is not affected by interchange of units.

The generalized case, the first and second repeaters 52, 54 are disconnected from lower priority units and connected to the local data unit by switching systems 56, 58 respectively (shown as electromechanical switches solely for ease of visualization), these being controlled by priority selection circuits 60. Particularly with a substantial number of units, request signals will generally be transmitted from one or more units, and the switches 56, 58 will generally be in the bypass position shown. The priority selection circuits 60, however, are arranged so that an operative unit in the chain which is of higher priority does not transmit a request signal until the selection of another unit has terminated, at which time priority is established on the basis of the highest priority unit having a then existing request status. If that unit is the pooling circuit 24 shown, all lower priority units are disconnected from the chain and the request signal is transmitted to the central recorder.

Figure 3:
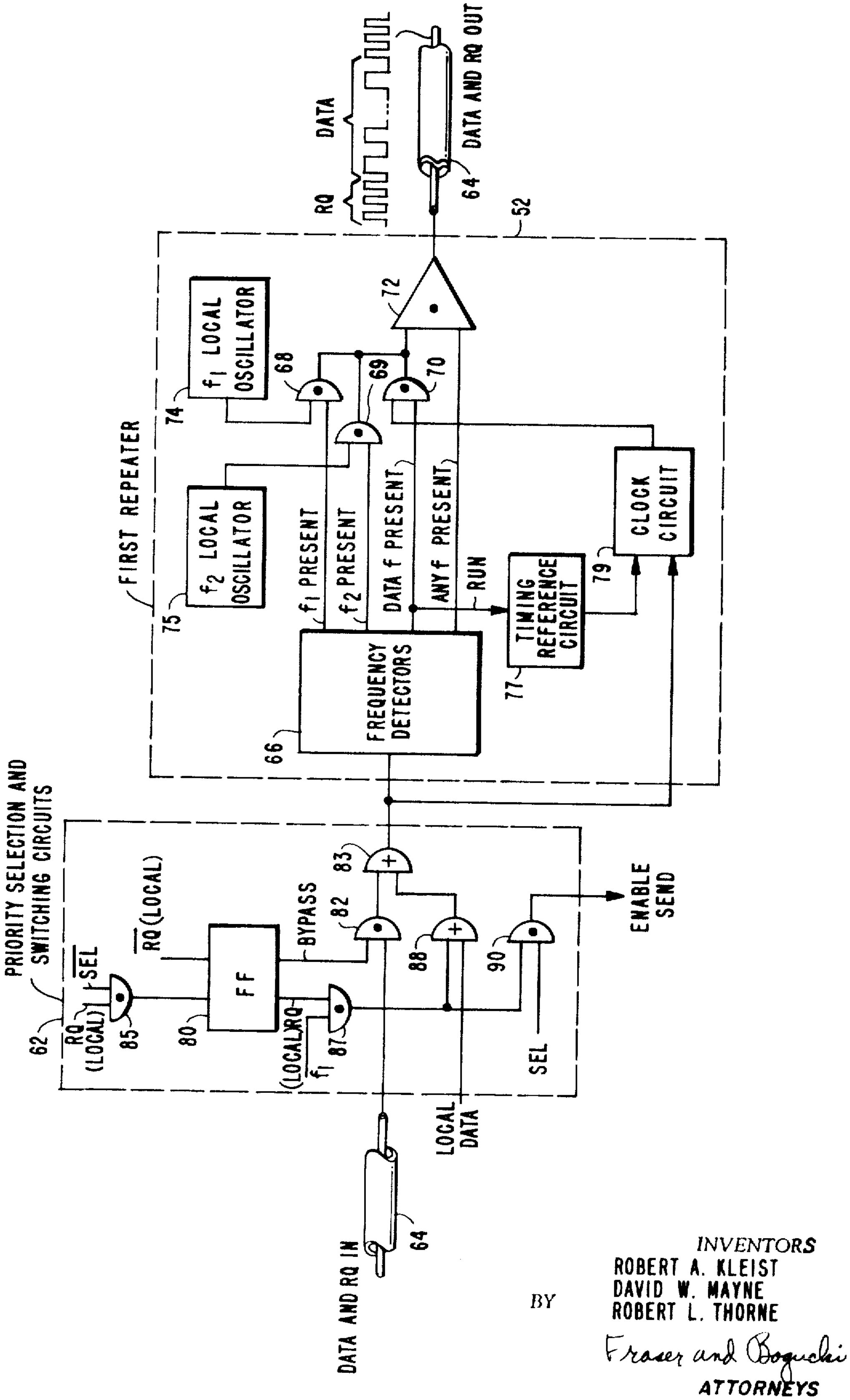
FIG. 3 is a combined schematic and block diagram representation of further details of a pooling circuit that may be utilized in the arrangements of FIGS. 1 and 2.

Further details of the pooling circuits are shown in FIG. 3, to which reference is now made. Only the first repeater 52 and the gating circuits 62 which comprise the priority selection and switching circuits are illustrated. Those skilled in the art will recognize that a number of the functions can be duplicated, such as self-clocking of the data signals, inasmuch as transmitted and returned data are not provided at the same time. To simplify the representation, however, the first repeater 52 and the associated priority selection and switching circuits 62 are shown in separate form. The input and output conductors into the pooling circuit comprise coaxial cables 64 for transferring rectangular waveforms at three different frequencies, with minimum attenuation and phase shift. The three frequencies are referred to herein as $f_1$, $f_2$ and the data frequency. Considering initially only the transfer of input data, the RQ signal may be provided at the $f_1$ frequency, here chosen as 2,560 kc., or 2.56 MHz., with $f_2$ being 640 kc. and the data frequency being 160 kc. It will be observed that these frequencies vary by multiples of 4, these separate signals being detected in separate frequency detectors 66. Considering the bypass operation initially, data is preceded by signals at the RQ frequency ($f_1$), and followed by the same frequency. The signals are reconstituted, with slight delay in the data signals, by utilizing the outputs from the frequency detectors 66 to condition separate AND-gates 68, 69, 70 coupled to the input of an amplifier 72. The remaining inputs of the AND-gates 68, 69 are actuated by $f_1$ and $f_2$ local oscillators 74, 75 respectively. Thus, the input signal is reconstituted by being converted to enabling signals which then control the output of the locally generated frequencies. The same reconstitution occurs in the data, but inasmuch as the data has a time varying sequence, the data is reconstituted in a self-clocking circuit which may be any of a number of types utilized in data transmission systems and other systems for eliminating short term phase variations in successive transitions of a signal provided at a selected frequency. In the example shown, the enabling signal indicative of the presence of the data frequency actuates a timing reference circuit 77, specifically by gating out signals from a crystal controlled oscillator stable at the data frequency rate within close limits over a substantially longer interval than that required for transmission of a data block. The timing reference circuit 77 thus provides stable reference transitions for a clock circuit 79, which utilizes these transitions in eliminating time variations in the directly applied data signals. Briefly, the transitions occurring in the stable reference signal may be delayed by approximately 3 microseconds relative to the nominal transition in the data signal. Transitions in the data signal are used to set and reset a flip-flop which conditions gates that are fully activated at precise times determined by the arrival of the reference signal transition. Thus, the data signal also is actually reconstituted by the self-clocking circuits, and additional wave shaping and amplification may be employed in the clock circuit 79 if desired. This output signal is also provided to the amplifier 72 through the AND-gate 70, the amplifier 72 being enabled by a signal from the frequency detector 66 that indicates that any frequency is present. Signals at the frequency levels chosen preserve their sharp transitions when transmitted through the RF line 64.

Gating of the various signals through the chain and the selection of priority are effectively accomplished within the priority selection and switching circuits 62, which receive the locally generated RQ signal, and the externally generated SEL signal, together with the local data and the input from the lower priority units in the pooling chain. If no local request is present, a flip-flop 80 conditions an AND-gate 82 with what may be termed a bypass signal, so that RF input from the pooling chain activates the AND-gate 82 to generate a rectangular wave output at the frequency then being transmitted. This is passed through an OR-circuit 83 to the first repeater 52. The flip-flop 80 is switched to provide a local request, which indicates that the associated data input unit is requesting the line when the RQ signal from the data unit and the SEL signal concurrently exist to activate an AND-gate 85. As long as the SEL signal is present, the flip-flop will not be set to the state at which the local RQ signal is generated. The SEL signal is of course provided from the heat unit in the chain through the second repeaters, not shown in FIG. 3. The SEL signal can be generated during the entire interval of selection until the data block is completed by coupling together the $f_2$ present and data frequency present signals and generating the SEL signal with an inverter, as one example. Once the flip-flop 80 is set to generate the local RQ signal, the $f_1$ signal passes through an AND-gate 87, an OR-gate 88 and the OR-gate 83 into the first repeater 52. When local data is provided, the $f_1$ signal is gated off, and the local data is passed through the OR-gate 88 into the first repeater 52. The local data is provided from the key unit in response to the provision of the SEL signal concurrently with the local RQ signal, to fully activate an AND-gate 90.

As noted above, only one frequency $f_1$, or $f_2$ need be employed at a given repeater, in conjunction with the data. The presence of two frequencies, however, permits considerably greater facility in automatic operation. In the first repeater chain, the $f_1$ signal can be used in conjunction with data requests, and the $f_2$ signal can be used in conjunction with program requests, with the opposite conditions applying at the second repeater. Whether data is transferred or programs are transferred, the pooling circuits 24 are seen to operate in precisely the same fashion, both in selecting priority and in shifting the command and data signals along the chain.

Figure 4:
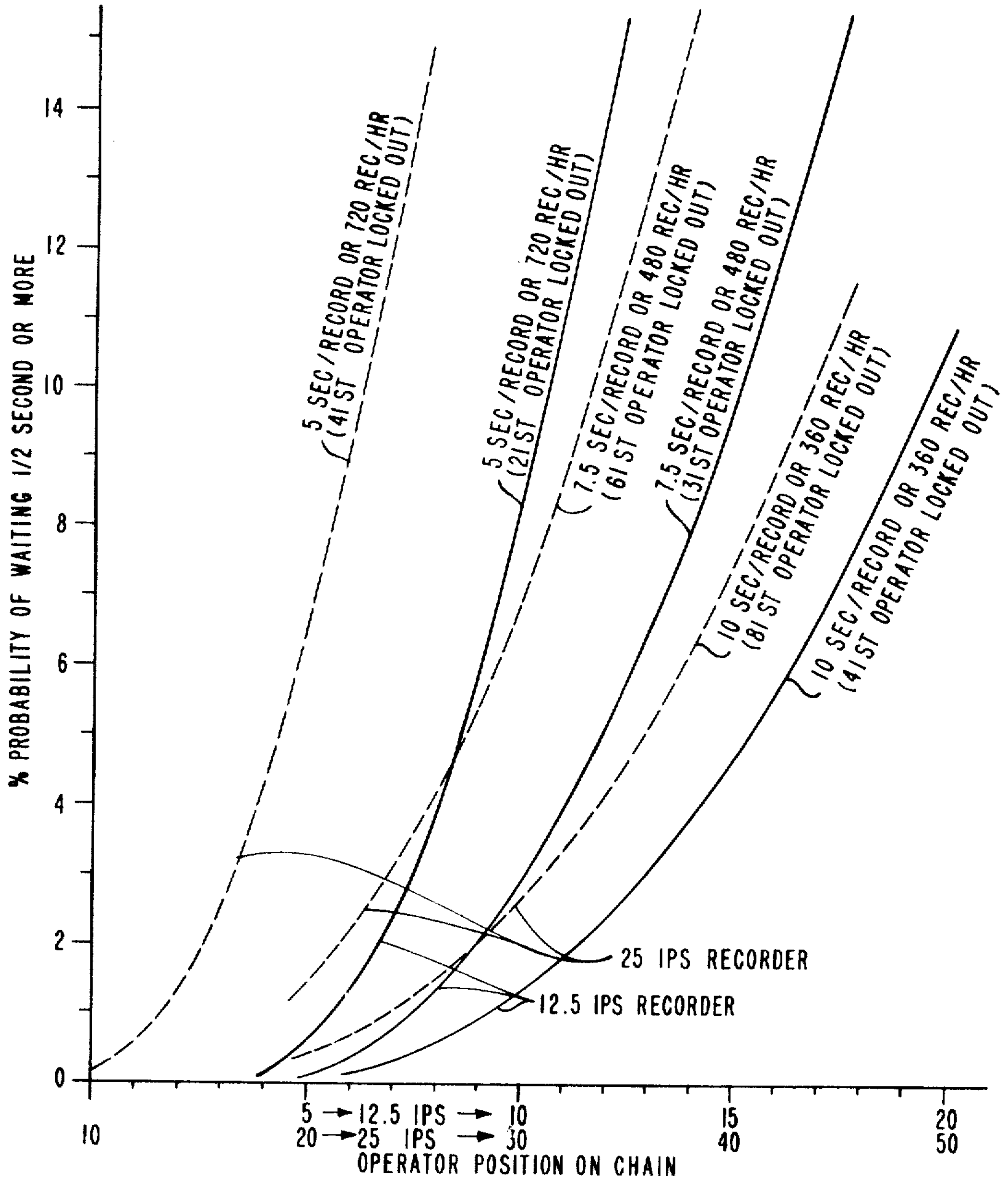
FIG. 4 is a graphical representation of priority position in a pooling chain versus probable operator delay times for various system configurations, useful in explaining the operation of systems in accordance with the invention.

To further understand the significance of this simplified queuing and priority system, reference may be made to FIG. 4. It should first be appreciated that the queuing system does not operate to assemble a sequence of messages, except in the sense that a number of requests placed on line at the same time will be treated in the order of station priority, if no other requests occur in the meantime. At each instant in time, however, priority selection is based first upon priority status in the chain, for units that are ready to transfer data blocks. The highest priority units in the chain therefore constantly are free to interrupt the lower priority units, thus changing the priority relationship. The practical example of a system being described does not, however, in fact introduce any significant delay in operator access time to the central recorder. As previously noted, with approximately 8 to 10 seconds being required for a typical record, the transfer time requirements and the pooling chain position, together with the nature of the central recorder, determine the probable waiting time for a given operator in the chain. The graphical representation of FIG. 4 illustrates the statistical probability, in percentage, that a given operator in the chain, whose position is denoted along the abscissa, will be required to wait for more than one-half second, which is clearly an acceptable delay time. The curves presented are based on the use of a 25 i.p.s. recorder (shown in dashed lines) as against a 12.5 i.p.s. recorder, as shown in solid lines. With the 12.5 i.p.s. recorder, and the 10-second per record average entry time, the 20th operator in the chain has only approximately a 10 percent probability of waiting one-half second or more. With up to 10 operators in the chain there is less than 2 percent probability. On this basis, approximately the 41st operator is locked out, i.e., unable to gain access at any time. In comparison, with the 25 i.p.s. recorder, and shifting to the lower reference scale on the abscissa, over 25 operators can be on line with a 10-second per record interval time before a 2 percent probability of an excess of ½-second-wait exists.

These release times were calculated on the following general basis. It is assumed that each operator releases records to the pooling chain at the same uniform rate, and that once the channel is obtained it is kept busy for a fixed time in processing the record. Each station therefore causes the channel to be busy for a given proportion of the total time available. Each operator is assumed to release a new record at a random time (at random phases in time, even though at a uniform rate). It is further assumed that the number of stations is not near saturation, and that the waiting times are substantially less than the product of the total number of stations times the average cycle time to complete processing a record. The example also assumes relatively steady state conditions, i.e., the absence of a substantial backlog of requests that must be worked off.

Figure 5:
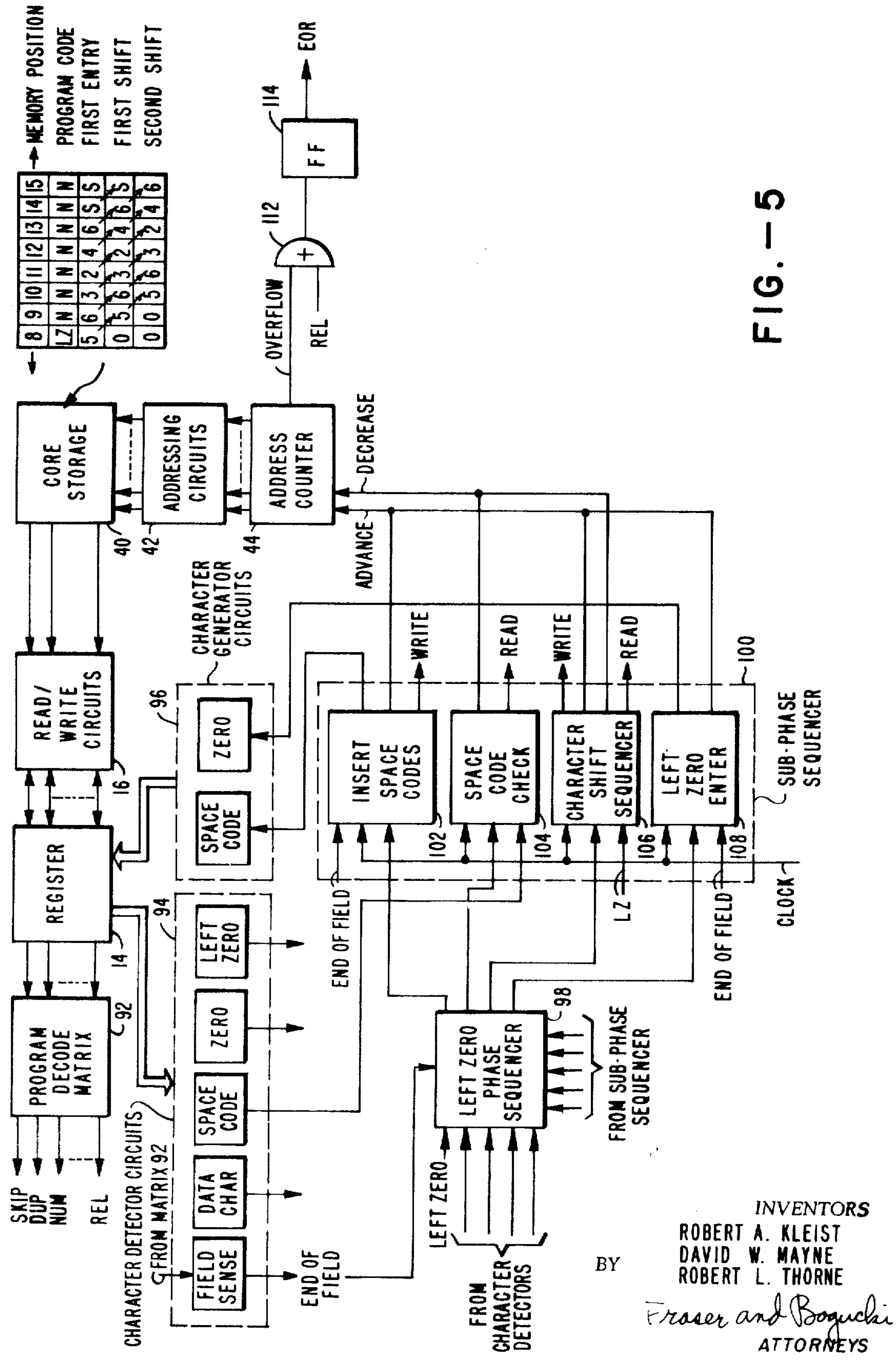
FIG. 5 is a block diagram of a left zero adjust and programmed record length control system in accordance with the invention; and, FIG. 6 is a block diagram of a circuit for providing program interchangeability in accordance with the invention.

The left zero and variable program length operations are accomplished by separate control circuits associated with the data and program memory 16, only the principal units of which have been illustrated in FIG. 5, to which reference is now made. A program decode matrix 92 generates individual signals representative of the varied available program codes, and character detector circuits coupled to the register 14 as well as the matrix 92 detect the end of the field, whether the character being read is a data character or some other character, space code characters, which are used as temporary fillers in a field and carrying out the left zero function. At the particular times in the operation of the circuit, space codes or zeros are written into the memory from separate character generator circuits 96. It will be appreciated that decoding matrices are utilized in place of the circuits 94, 96, and that these matrices accomplish many other functions as well as the specific detection and signal generation described, but these elements have been extracted in order to provide a clear description. Similarly, the sequence and control circuits for the left zero function are in practice arranged as a subcontroller having a phase counter, a decode matrix, and separate subphase counters and matrices for carrying out particular internal functions in addition to those involved in the left zero operation. Similarly, the principal elements of the left zero system have been extracted and shown as a left zero phase sequencer 98 and a subphase sequencer 100 which comprise control circuits that operate the address counter 44 to advance or decrease the count in predetermined patterns, while also operating the read/write circuits 46. Separate units within the subphase sequencer have been designated by functional designations, such as the insert space code unit 102, the space code check unit 104, the character shift sequencer 106 and the left zero enter unit 108. The limited and repetitive functions provided by these units will be described in further detail hereafter in conjunction with the specific example of left zero operation.

The core storage 40 as previously described has 200 character positions, and in normal operation the address counter overflows when a count of 200 is reached, this overflow being directed through an OR-circuit 112 to set a flip-flop 114 which generates the end of record signal, and initiates the next phase of operation, such as the transfer of entered data to a data recorder. The release (REL) signal derived from the program decode matrix 92, however, may alternatively be utilized to generate the EOR signal, so that an REL code in a program position can effectively terminate a record.

In left zero operation, as shown in the example of a typical field from positions 8 through 15 in the core storage 40 (depicted adjacent to the core storage 40), data entry proceeds through a sequence of numeric data to a length which is less than the total available length of the field. The left zero program characters start with the left zero code (LZ), and thereafter designate numeric data (N). It is desired to justify the given number (563,246) to the right-hand margin in the field, at position 15. With the left zero phase sequencer 98 activated by the left zero signal, which may be program encoded as shown in the first position in the field and thereafter retained until the operator indicates that data entry for the field is being completed, the first phase entered is that of inserting space codes in the remaining positions (14 and 15) of the field. These space codes are filler codes which have no meaning. The insert space code unit 102 provides a write signal to the read/write circuits, and advances the counter 44 under control of the clock, while generating the space code in the generator circuits 96 so as to enter this character into positions 14 and 15 of the memory. The end of the field is established by the character detector circuits 94, when the program character for the start of the next field is identified, at which point the space code entry is terminated. The end of field indication is returned to the left zero phase sequencer 98 to then initiate the next subsequence, in which the right end character in the data block is located by decreasing the counter 44 one step to read the character at position 15. If this is a space code, the phase sequencer 98 activates the character shift sequencer 106 to in effect shift each data and space code character by one position to the right in the memory, eliminating the right end space code. Starting with the right-hand numeral (6) in position 13, therefore, this position is read into the register 14, the address counter is advanced one position and the character is then written in at position 14 of the memory. Then the address counter 44 is caused to decrement two counts to position 12 to write in the next character (4) in the memory at position 13. This sequence is continued until the LZ at the start of the field is detected, at which point a zero is entered at the left-hand end of the field by the left zero enter unit 108, activated in its turn by the left zero phase sequencer 98. After entry of the zero, the counter 44 is advanced by the left zero enter unit 108 until the first character of the next field in the memory is again being addressed. The system then again commences a shift operation, by again activating the space code check unit 104, and then the character shift sequencer 106 if a space code is present, as it is in this example. At the completion of entry of the next left zero by the unit 108, the system has completed the left zero operation. The operation is terminated when the absence of a space code is thereafter sensed by the unit 104.

This arrangement of the left zero control requires no modification of the memory system, and is independent of the length of the field across which left zero adjustment may be desired. It is also independent of the relative length of entered data within the field, in comparison to the total length of the field. The operation is preferably begun by the use of the left zero key after sensing of the left zero code in the program storage to insure against inadvertent or other improper initiation. The individual repetitive sequences are dependent either upon fixed numbers of advance and decrease count pulses, or upon the detection of particular codes, so that specific exemplifications of the circuits have not been included inasmuch as they will be evident to those skilled in the art.

The same arrangement permits programmed record length to be achieved, by virtue of the incorporation of the release code in the program. When a program is transferred from an external source into the memory, or a new program is written, the end of record code can be entered anywhere between the 20-character minimum (imposed only by minimum record length considerations for associated data processing systems) and a maximum available number of characters of 200 in this particular example. Each of the two available programs can be of a selected and different length, and the employment of this programming feature saves both operator time and conserves record length on the tape.

Figure 6:
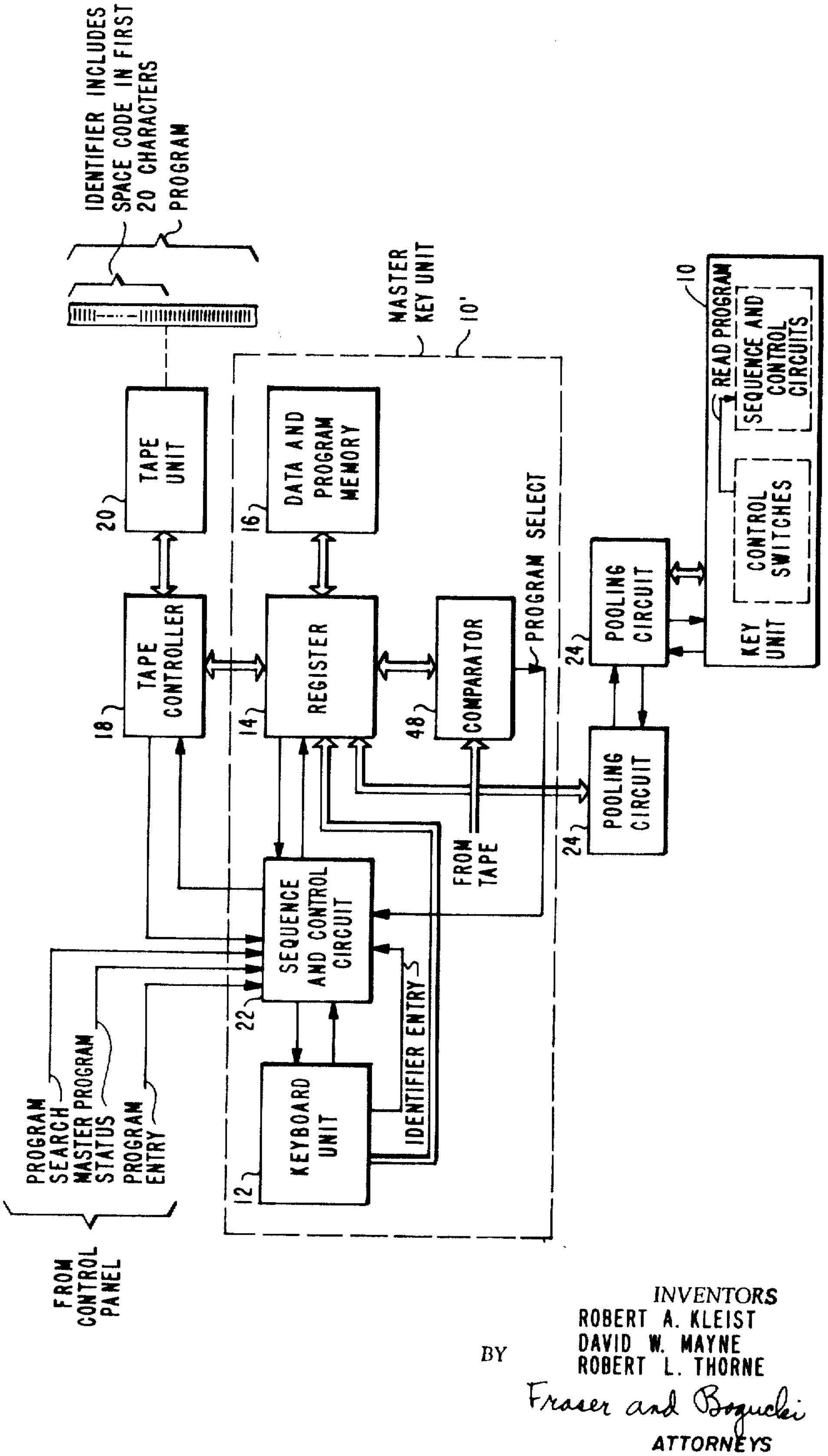

The manner in which this system operates to transfer programs along the pooling chain in a fashion like the transfer of data has previously been described. No internal modifications are needed in the units, except for selection of settings on the control panels representative of the status of the central recorder, here shown as a master key unit and designated 10' for convenience, and the individual key unit 10 that is in the pooling chain. The diagram of FIG. 6, to which reference is now made, corresponds to the diagrams of FIGS. 1 and 2 and the units are similarly designated, except that those functional portions of the system that are significant in terms of the program entry and interchange functions have been separately designated.

As far as the master key unit 10' is concerned, an individual operator may actuate the control panel switch to establish the program entry mode, so that a program may be entered from the keyboard unit directly into the memory, for subsequent control in data entry. This option is also available at the key unit 10, although it is ordinarily preferred not to permit individual operators to have the capability of changing programs.

In a second mode of operation of the master key unit 10' therefore there is involved master program transfer, in which the stored program is to be made available from the memory to the pooling chain, in a fashion identically corresponding to the transfer of data blocks. The master program status is selected at the control panel of the master key unit 10', while at the individual key units 10, the operators select the control switches to request master program. The individual key units 10 are thereafter serviced in accordance with their priority status, with data being entered into the program portion of the memory instead of the data portion.

Manually entered programs at the master key unit 10' or the two programs available from local memory are not sufficient for the wide variety of functions that may have to be undertaken. A program tape may therefore be put on the tape unit 20, this program tape containing a substantial number of programs, each identified by a particular identifier portion, the identifier portion having at least one space code in the first 20 characters thereof to provide a unique distinction between identifier and program blocks. The tape controller 18 may be arranged to incorporate a search system providing bidirectional operation of the tape, with high-speed scan. For present purposes, however, it is assumed that the tape controller is started (by operation of the search mode switch selected at the control panel), with the tape at the BOT tape marker, and that it simply scans through the identifier blocks and their associated programs in the forward direction, with data being compared on a character-by-character basis at the comparator, which received data both from successive positions in the memory 16 through the register 14, and the identifier characters from the tape unit 20. Once the identifier is recognized, a program select signal is returned to the sequence and control circuit 22, and the next block on tape (the program block) is entered directly into the program portion of the memory 16. Once located in the memory, the program may be used internally or transferred along the pooling chain as previously described.

Although various forms of input data preparation systems and particular aspects of those systems have been described, it will be appreciated that a number of other variations and modifications are feasible within the scope of the invention as defined by the appended claims.

What is claimed is:

1. An input data preparation system for serially combining digital data records derived from a variable number of input units into an orderly succession of records along a single transfer link comprising:

at least two data input units, each including means for providing an available digital data record as output on command;

and at least two pooling circuit means, each coupled to a different data input unit and separately intercoupled in a serial pooling chain having successively varying priority positions, each pooling circuit means transferring commands and data along the chain and each including priority selection means separately responsive to the availability of data records and to commands to provide transfer of an individual available data record from its associated data input unit when the unit occupies the highest priority position having available data at the time of a command.

2. The invention as set forth in claim 1 above, wherein at least one of said data input units includes keyboard data entry means for asynchronously generating each digital data controlled record at operator-controlled rates, and wherein transfer of data occurs at substantially higher rates, said system operating to select a new record for transfer at the completion of each prior transfer in order of priority position and without regard to previous availability.

3. The invention as set forth in claim 2 above, wherein said pooling circuit means comprise like modules, and provide bidirectional transfer of both commands and data along the chain.

4. An input data preparation system for entry of data in computer-compatible form from a variable number of different data input systems comprising:

at least two data input system means, each including means for storage of a block of data, means for output transfer of the block of data, and means providing signals indicating the availability of a data block for transfer;

data processing means including storage means coupled to receive blocks of data as output transfers and means for providing a signal to select data transfer;

at least two pooling circuit means coupled in series and each coupled to a different one of said data input system means, each said pooling circuit means including means for transferring blocks of data from each data system means bidirectionally along the series between said data processing means and the individual data input system means, each said pooling circuit means being responsive to said signals indicating the availability of a data block for transfer and said signals to select data transfer, to effect transfer in accordance with the highest priority position indicating availability when a signal to select data transfer is provided, thereby providing a queuing system.

5. An input data preparation system for generation of a single computer-compatible record from a selectable number of data input systems comprising:

at least two data input systems, each including storage means for a data block, and means for providing the characters of the data block as output in response to a command;

at least two pooling circuit means, each including signal transfer and signal disconnect means, each coupled to a different data input system, each including means for coupling to both higher and lower priority pooling circuit means in a series chain and means for transferring both data blocks and command signals between the associated data input system and the higher priority pooling circuit means, the signal transfer and signal disconnect means being coupled to transfer both data blocks and control signals between the higher and lower priority pooling circuit means, and disconnecting all lower priority pooling circuit means when transferring from the associated data input system;

and computer-compatible recording means coupled to the highest priority pooling circuit means.

6. An input data preparation system for generation of a single computer-compatible record from a selectable number of data input systems that may be of different types comprising:

at least two data input systems, each including storage means for a data block of no greater than a given length, and means for providing the characters of the data block as output in response to a command;

at least two pooling circuit means, each including signal transfer and signal disconnect means, each coupled to a different data input system, each including means for coupling to both higher and lower priority pooling circuit means in a series chain and means for transferring both data blocks and command signals bidirectionally between the associated data input system and the higher priority pooling circuit means, the signal transfer and signal disconnect means being coupled to transfer both data blocks and control signals between the higher and lower priority pooling circuit means, and disconnecting all lower priority pooling circuit means when transferring from the associated data input system;

and computer-compatible recording means coupled to the highest priority pooling circuit means, said recording means including storage means for a data block, and means for returning a received data block along said pooling circuit means for comparison.

7. The invention as set forth in claim 6 above, wherein said data input systems include means for generating data block availability signals, and wherein said data input systems transfer a data block in a substantially shorter interval than the time required to generate the data block, and wherein said recording means includes means for coupling command signals to said pooling circuit means to initiate transfer of an available data block in accordance with priority position.

8. The invention as set forth in claim 7 above, wherein said data input systems are substantially like modular units including keyboard units, and wherein said pooling circuit means are substantially like modular units.

9. The invention as set forth in claim 8 above, wherein said recording means comprises a digital magnetic tape recorder having a selected transfer rate characteristic, and wherein at least one of said data input systems includes a coupled digital magnetic tape recorder having a lower transfer rate than that selected for the recording means.

10. The invention as set forth in claim 9 above, wherein said input data preparation system comprises at least two data input systems having keyboard units coupled to provide an asynchronous data entry function, and wherein at least one of said data input systems includes a digital magnetic tape recorder and is coupled to provide a data verification function.

11. The invention as set forth in claim 9 above, wherein the at least one of said data input systems is coupled to provide a merge function.

12. An input data preparation system for entry of data from a variable number of input stations on a magnetic record system with acceptable operator delay times comprising:

a variable plurality of operator-controlled data input units, each including means for storing at least one data block as generated, means for transferring the data block synchronously as output at a substantially higher rate than it is generated, and control means for generating signals to enable data storage, output transfer, and pooling;

a variable plurality of pooling circuit means coupling said data input units in a series chain, there being at least one pooling circuit means coupled to each different data input unit and each including means for transferring data blocks and pooling enable signals, said pooling circuit means each including means for disconnecting all lower priority units in the chain when transferring a data block;

and recording means coupled to the highest priority of said pooling circuit means in the series chain and operable to store data blocks provided therefrom.

13. The invention as set forth in claim 12 above, wherein said recording means includes means for storing a data block received along the series chain, and means for retransferring said data block along the chain prior to recording, and wherein each of said data input units includes means for comparing retransferred data to the data block stored therein.

14. The invention as set forth in claim 13 above, wherein each of said data input units further includes means for generating a select signal for data transfer, and wherein said recording means is coupled to the data input unit that is in turn coupled to the highest priority pooling circuit means.

15. The invention as set forth in claim 13 above, wherein said data recording means includes means for generating a select signal for data transfer, and wherein said recording means comprises a central recorder coupled to the highest priority pooling circuit means.

16. An input data preparation system for entry of data in computer-compatible form from a variable number of keyboard systems comprising:

at least two keyboard system means, each having means for character-by-character storage of a block of keyboard-entered data, and means for output transfer of the block of data at a substantially higher rate;

means coupling said keyboard system means in series, said means including means for transferring blocks of data from each successive keyboard system means to the storage of the first of said keyboard system means;

and a magnetic tape unit coupled to receive blocks of data as output from the first of said keyboard system means.

17. The invention as set forth in claim 16 above, wherein said system includes means for retransferring a transferred data block along the chain prior to recording, and wherein each of said data input units includes means for comparing retransferred data to the data block stored therein.

18. An input data preparation system for entry of data in computer-compatible form from a variable number of keyboard systems comprising:

at least two keyboard system means, each including means for character-by-character storage of a block of keyboard-entered data, means for synchronous output transfer of the stored block of data at a substantially higher rate, means for character comparison of stored data block with a returned data block, and sequence control means for generating control signals to sequentially govern storage of individual characters, transfer of a stored block of data as output, reception in storage of pooled data blocks, return of pooled data blocks from storage, and comparison of returned data blocks to stored data blocks;

pooling circuit means coupling said keyboard system means in series, said pooling circuit means including means for transferring a stored block of data as output from each successive keyboard system means, means for transferring control signals bidirectionally along the series, and means for returning a block of data from the storage of the first of said keyboard system means for character comparison;

and data recording means coupled to receive blocks of data as output transfer from the first of said keyboard system means.

19. The invention as set forth in claim 18 above, wherein the switchable sequence control means of the first keyboard system means in the series successively provides control signals for (1) reception of a pooled data block, (2) return of the stored pooled data block and (3) transfer of a stored data block as output and wherein the switchable sequence control means of each other keyboard system means than the first provides (1) storage of keyboard-entered characters, (2) transfer of a stored data block as output and (3) comparison of returned data blocks.

20. An input data preparation system for efficient entry of data in computer-compatible storage from a variable number of keyboard systems comprising:

a first keyboard system means, including internal means for storage of a data block as asynchronously generated at the keyboard, and means for synchronous output transfer of the stored block at a substantially higher data rate;

means coupled to receive output transfers from said first keyboard system means and to generate a computer-compatible record;

a variable number of additional keyboard system means, each like the first;

and a variable number of pooling system means coupled in a series chain in order of priority, each including data bus means coupled to the means for storage of a different keyboard system means, each including series-connected intercoupling means, each including means for disconnecting all lower priority pooling system means in the chain when transferring a data block, and each including means for converting data bus signals to data transmission signals and vice versa, such that a variable number of keyboard systems time share a record generated by said means to generate a record.

21. The invention as set forth in claim 20 above, wherein said system additionally includes enabling sequence means as a part of each keyboard system means, said enabling system means being coupled to enable the means for storage and the means for output transfer, and wherein the enabling sequence means of the first keyboard system means is coupled to control the remainder of said keyboard system means through the intercoupled pooling system means, and wherein each of said pooling system means includes priority selection means responsive to the enabling sequence means and the transfer of data blocks for entering a data block from the associated data bus means into the pooling system means.

22. An input data preparation system for key entry of data from a variable number of stations on a magnetic record system comprising:

a plurality of key input units, each having means for storing a block of asynchronously generated data characters having parallel bits, means for transferring characters of the stored block synchronously as output with the bits in parallel, and controllable means for enabling block transfer;

a magnetic record system operable to store individual blocks of synchronously transferred data characters, said magnetic record system being coupled to a first of said key input units to receive outputs therefrom;

and a plurality of pooling circuits coupled in a priority series chain, each pooling circuit being coupled to a different one of said key input units and being coupled for data transfer with the means for storing therein, the highest priority pooling circuit being coupled to the first key input unit, and each including means responsive to block transfer enabling signals for providing an individual block of generated data as output while disconnecting all lower circuits in the chain.

23. An input data preparation system for key entry of data from a variable number of stations on a digital magnetic tape recording system comprising:

a plurality of key input units, each having means for storing a block of asynchronously generated data characters having parallel bits, means for synchronously transferring, as output from the key input unit, the stored block characters with the bits in parallel upon completion of generation of a block, and controllable means for enabling the means for storing, the means for transferring and providing individual enabling signals for a recording system and a pooling circuit;

a digital magnetic tape recording system operable to store individual blocks of synchronously transferred data characters, said recording system being coupled to a highest priority one of said key input units to receive outputs therefrom and receiving enabling signals therefrom;

and a plurality of pooling circuits coupled in a series chain with a first being coupled to the means for storing of a first of said key input units, and each pooling circuit being coupled to a different one of said key input units, each pooling circuit including means responsive to pooling circuit enabling signals from the controllable means for transferring an individual block of data between the means for storing of the associated key input unit and the magnetic tape recording system, said pooling circuits each including means responsive to the data transfer operations along the chain for withholding transfer of data from the associated key unit until the chain is available, and means for disconnecting all lower order pooling circuits in the chain when transferring a data block.

24. An input data preparation system for key entry of data from a variable number of stations on a digital magnetic tape recording system comprising:

a plurality of key input units, each having means for storing a block of asynchronously generated data characters having parallel bits, means for synchronously transferring, as output from the key input unit, the stored block characters with the bits in parallel upon completion of generation of a block, and control circuit means for enabling the means for storing and the means for transferring and providing individual enabling signals for a recording system and a pooling circuit, said control circuit means also including means for receiving request signals indicating the availability of a data block at a key input unit;

a digital magnetic tape-recording system operable to store individual blocks of synchronously transferred data characters, said recording system being coupled to a first of said key input units to receive outputs therefrom and receiving enabling signals therefrom;

and a plurality of pooling circuits coupled in a series chain with each being coupled to the means for storing and the control circuit means of a different one of said key input units, each pooling circuit including means responsive to pooling circuit enabling signals from the control circuit means for transferring an individual block of data between the means for storing of the associated key input unit and the magnetic tape-recording system, said pooling circuits each including means responsive to data transfer operations along the chain for withholding transfer of data from the associated key unit until prior transfer along the chain has terminated and means for disconnecting all lower order pooling circuits in the chain when transferring a data block, and further including means for transferring control signals and data blocks serially and bidirectionally along the series chain.

25. An input data preparation system for key entry of data from a variable number of operator-controlled keyboard stations on a single magnetic record system with acceptable operator delay times comprising:

a variable plurality of key input units, each including means for storing a data block and means for transferring the data block as output;

means for coupling said key input units in a series chain, said means for coupling including means for transferring data blocks along the chain, said means for coupling including means for disconnecting all lower priority key input units in the chain during transfer from a given key unit and being coupled to the means for storing of the first of said key input units in the chain;

and recording means coupled to the means for storing of the first of said key input units and operable to store data blocks provided therefrom.

26. A key input station for providing enter, merge and verify data operations for an input data preparation system providing blocks of data, comprising:

keyboard means providing binary-coded key data in response to operator actuation;

memory means, including addressing means, having a succession of character positions, each of said character positions including data character bits and program bits, said program bits identifying data fields;

input-output coupling means, providing data and control line couplings between the output of said key input station and said keyboard means and memory means;

comparator means for character comparison;

data bus means coupling said keyboard means, memory means, inputnoutput coupling means and said comparator means;

and sequence and control means, including selectable function control means, coupled to said keyboard means, memory means, comparator means and input-output coupling means, said sequence and control means including means for effecting comparison of successive characters on said coupling means to successive characters in said memory means, and means for transferring a complete data block as output from the key input station.

27. The invention as set forth in claim 26 above, wherein said input-output coupling means includes means for transferring data to an associated output recording device or alternatively to an associated pooling device, and wherein in addition said sequence and control means includes means for providing keyboard enabling, output recording enabling and pooling enabling and request signals.

28. The invention as set forth in claim 27 above, wherein said sequence and control means includes switchable means for selecting alternation between (1) keyboard enabling and output recording enabling signals (2) between keyboard enabling and pooling request signals and (3) between pooling enabling and output recording enabling signals.

29. The invention as set forth in claim 26 above, including in addition register means coupled to said data bus means, said memory means and said sequence and control means.

30. In a key input system that is operator controlled to generate a block of data characters arranged in predetermined fields, a system for automatically varying the contents of the data block comprising:

data block memory means responsive to key input characters, said memory means including means for storing data characters in individual successive positions with predetermined fields in a storage of selected maximum length, each of said character positions including related program information;

means for detecting program information at particular character positions in the memory;

means responsive to key input characters and to program information at the character positions for entering data characters in selected fields of said memory;

and memory controller means responsive to the detected program information for altering the location of data characters within a field.

31. The invention as set forth in claim 30 above, wherein said memory means includes addressing means including an addressing counter, and wherein said memory means includes a left zero program instruction at the start of a selected field, and wherein said memory controller means includes means for detecting the left zero program instruction and actuation of the left zero key to shift all data characters within the field in successive shift cycles, each data character being shifted one position toward the last position in the field in each shift cycle, until the terminal data character occupies the terminal position at that edge of the field.

32. The invention as set forth in claim 30 above, wherein said memory means includes counter means coupled to provide an overflow signal at the completion of entry of a maximum length data block, wherein said means for detecting is responsive to a programmed end of record program instruction, and wherein said memory controller means responds to detection of the end of record instruction by generating an end of record signal on the overflow line.

33. A left zero shifting system for a key input station having a memory with one character position for each character in a record block, each character position including a program instruction, with the first program instruction in the field being a left zero program instruction, said system further including address counter means for controlling the addressing of said memory means, together with read and write means, said left zero shifting system comprising:

means for sensing program instructions denoting beginning of left zero field and end of field for successive characters;

operator-controlled left zero control signal generating means;

character generating means, including means for generating zeros and filler codes;

means for sensing filler codes in data character positions;

means responsive to the presence of the left zero signal and the prior presence of the left zero program instruction in a field for initiating a left zero operation; and memory controller means responsive to the initiation of the left zero operation means, said memory controller means including (1) means responsive to the initiation of the left zero operation for actuating the read-write means of the memory and the filler code generating means for writing filler codes in the data character positions remaining in the field, (2) means responsive to the sensing of end of field and to the means for sensing filler codes for determining the presence of a filler code at the end of the field, said means terminating the operation if no filler code is sensed, (3) means responsive to the presence of a filler code at the end of the field for shifting all characters toward that end by one position in a shift cycle with the last filler code in the field being lost, (4) means responsive to the sensing of a beginning of left zero field program instruction and coupled to actuate the read-write means of the memory and the zero generating means for entering a zero in the first field position of the memory, and (5) means for repeating the sensing of filler codes, shift cycles and zero enter until no further filler codes exist in the field.

34. For a key-operated input data preparation system of the type having a multicharacter memory, each character having accompanying program instructions, a system for changing the program instructions comprising:

a digital memory system having a plurality of serially disposed program blocks, each adjacent an identifier block having a characterizing character;

comparator means coupled to said memory means and to said digital memory system;

operator-controlled switch means for selecting (1) program entry from memory or (2) program entry from keyboard;

means including the keyboard unit of the key input means and responsive to the operator-controlled switch means for entering (1) a selected identifier in the data portion of said memory means or (2) program instructions in the program instruction portion of said memory means;

controller means coupled to operate said digital memory system to scan the serially disposed identifiers and program blocks in response to the selection of program entry from memory;

and means coupled to said comparator means and responsive to the location of a desired identifier thereby for entering the associated program block in the program instruction portion of said memory means.

35. The invention as set forth in claim 34 above, wherein said digital memory system comprises a digital magnetic tape recorder, wherein each of said program blocks has at least a predetermined number of instruction characters, and wherein the characterizing character in the identifier is a unique code character occurring in less than the predetermined number of characters from the start thereof.

36. An input data preparation system having at least two key input stations, and pooling circuit means intercoupling said stations for transferring data therebetween, each of said key input stations including a multicharacter position memory, each of the character positions including program instruction portions, and each key unit including switchable means for controlling program transfer, the highest priority one of said key input stations including means for entry of a selected program into the memory thereof, each successive key unit being responsive to the selection of program transfer at said switchable means, such that a program entered in the memory of the highest priority key unit is transferred along the pooling circuit means to the memory of a requesting key input station.

37. The invention as set forth in claim 36 above, wherein the highest priority key input station also includes a digital magnetic tape recording system coupled thereto, said magnetic tape-recording system including a series of program blocks each including an associated identifier, said highest priority key input station including means for locating a selected identifier block and transferring the associated program block into the memory, for available transfer along the pooling circuit means.

38. An input data preparation system for providing an orderly series of data blocks for further processing from at least two keyboard systems, comprising:

- a highest priority keyboard system and at least one other keyboard system, each having storage means including multiple character positions, each character position including program instructions therefor, and means for output transfer of a data block; and
- means coupling said keyboard systems in series, said means including means for transferring data blocks from the storage of each keyboard system to the storage of the highest priority keyboard system, and means for transferring program instructions from the storage of the highest priority keyboard system to the storage of each other keyboard system.

39. A left zero shifting system for a key input station having a memory with one character position for each character in a record block, each character position including a program instruction with at least one instruction identifying the beginning of a field, said system further including address counter means for controlling the addressing of said memory means, together with read and write means, said left zero shifting system comprising:

- means for sensing program instructions denoting beginning of field and end of field for successive characters;
- operator-controlled left zero control signal generating means;
- character generating means, including means for generating zeros and filler codes;
- means for sensing filler codes in data character positions;
- means responsive to the presence of the left zero signal for initiating a left zero operation; and
- memory controller means responsive to the initiation of the left zero operation means, said memory controller means including (1) means responsive to the initiation of the left zero operation for actuating the read-write means of the memory and the filler code generating means for writing filler codes in the data character positions remaining in the field, (2) means responsive to the sensing of end of field and to the means for sensing filler codes for determining the presence of a filler code at the end of the field, said means terminating the operation if no filler code is sensed, (3) means responsive to the presence of a filler code at the end of the field for shifting all characters toward that end by one position in a shift cycle with the last filler code in the field being lost, (4) means responsive to the sensing of a beginning of field program instruction and coupled to actuate the read-write means of the memory and the zero generating means for entering a zero in the first field position of the memory, and (5) means for repeating the sensing of filler codes, shift cycles and zero enter until no further filler codes exist in the field.

* * * * *